(12) United States Patent
McBride et al.

(10) Patent No.: US 10,970,174 B2
(45) Date of Patent: Apr. 6, 2021

(54) PRE-EMPTIVE DATA PRODUCTION SITE SWAP

(71) Applicant: International Business Machines Corporation, Armonk, NY (US)

(72) Inventors: Gregory E. McBride, Vail, AZ (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 15/831,229

(22) Filed: Dec. 4, 2017

(65) Prior Publication Data

US 2019/0171531 A1 Jun. 6, 2019

(51) Int. Cl.
*G06F 11/14* (2006.01)
*G06F 11/00* (2006.01)

(52) U.S. Cl.
CPC ........ *G06F 11/1461* (2013.01); *G06F 11/008* (2013.01); *G06F 2201/86* (2013.01)

(58) Field of Classification Search
CPC ............. G06F 11/1461; G06F 2201/86; G06F 11/008; G06F 11/2094; G06F 11/2097; G06F 2201/81; G06F 11/004
See application file for complete search history.

(56) References Cited

U.S. PATENT DOCUMENTS

| | | | |
|---|---|---|---|
| 8,843,621 B2 | 9/2014 | DeJana et al. | |
| 8,977,886 B2 | 3/2015 | Bauer et al. | |
| 9,471,350 B2 | 10/2016 | Pavlas et al. | |
| 9,684,574 B2 | 6/2017 | Zhou | |
| 2015/0169349 A1 | 6/2015 | Joffe | |
| 2016/0378628 A1* | 12/2016 | Nguyen | G06F 11/27 714/40 |

OTHER PUBLICATIONS

Mukherjee, Biswanath, "Network Adaptability from Disaster Disruptions and Cascading Failures," IEEE Communications Magazine 52.5 (2014): pp. 1-6.
Tornatore et al., "A Survey on Network Resiliency Methodologies against Weather-based Disruptions," 2016 8th International Workshop on Resilient Networks Design and Modeling (RNDM), IEEE, 2016, pp. 1-12.
"System for Proactive Move of Cloud Services to a Backup Location Based on Weather Predictions," IPCOM000249280D, IP.com, Feb. 15, 2017, pp. 1-2.

* cited by examiner

*Primary Examiner* — Albert M Phillips, III
(74) *Attorney, Agent, or Firm* — Kunzler Bean & Adamson

(57) ABSTRACT

Methods, systems, and computer program products that can pre-emptively swap operations of a data production site to a disaster recovery (DR) site. A method includes providing, by a processor, one or more weighting factors to a set of metrics for an event occurring at a data production site based on information related to the event, analyzing the set of metrics based on the one or more weighting factors, and generating a recommendation related to swapping operations from the data production site to a DR site based on the analysis. Systems and computer program products for performing the above method are also provided.

20 Claims, 12 Drawing Sheets

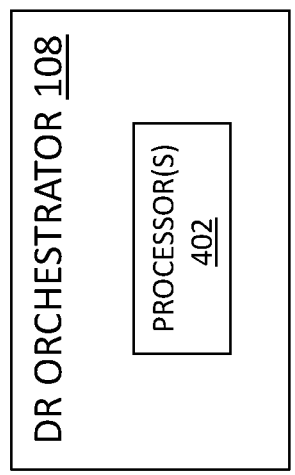

US 10,970,174 B2

PRE-EMPTIVE DATA PRODUCTION SITE SWAP

FIELD

The subject matter disclosed herein relates to storage networks and systems and, more particularly, relates to methods and systems that can pre-emptively swap operations of a data production site to a disaster recovery site.

BACKGROUND

At times of natural disaster or for other reasons, a data production site (e.g., a storage system and/or network) can go offline and/or otherwise become unavailable, which can be referred to as a disaster. If the data production site does not include copies of the data stored on the data production site, data can be lost, which can be costly in terms of data recovery and/or lost operational time. To ensure that data is not lost during a disaster, many conventional data production site utilize a disaster recovery site to store copies of the data.

While disaster recovery sites assist in data recovery when the data production site experiences as disaster, swapping from the data production site to a disaster recovery site can be costly. Further, conventional data production sites typically swap to the disaster recovery site after a disaster has occurred. In some instances, a swap occurring after the disaster has struck can be efficient because data can be lost between the time when the disaster strikes and the time when the swap occurs and/or is completed. Furthermore, a swap that occurs too far in advance of the disaster striking runs the risk of unnecessarily swapping sites, which results in unnecessary additional cost, especially if a subsequent site swap occurs from the disaster recovery site back to the data production site.

BRIEF SUMMARY

Methods, systems, and computer program products that can pre-emptively swap operations of a data production site to a disaster recovery (DR) site. A method includes providing, by a processor, one or more weighting factors to a set of metrics for an event occurring at a data production site based on information related to the event, analyzing the set of metrics based on the one or more weighting factors, and generating a recommendation related to swapping operations from the data production site to a DR site based on the analysis. Systems and computer program products for performing the above method are also provided.

One system includes a weighting module that provides one or more weighting factors to a set of metrics for an event occurring at a data production site based on information related to the event, an analysis module that analyzes the set of metrics based on the one or more weighting factors, and a pre-emptive module that generates a recommendation related to swapping operations from the data production site to a disaster recovery site based on the analysis. In some embodiments, at least a portion of the modules comprise hardware circuits, a programmable hardware device, and/or executable code stored on one or more computer-readable storage media.

Also disclosed are computer program products comprising a computer-readable storage medium including program instructions embodied therewith that can pre-emptively swap data production sites. Some program instructions are executable by a processor and cause the processor to provide one or more weighting factors to a set of metrics for an event occurring at a data production site based on information related to the event, analyze the set of metrics based on the one or more weighting factors; and generate a recommendation related to swapping operations from the data production site to a disaster recovery site based on the analysis.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 4 is a diagram of one embodiment of a DR orchestrator included in a storage systems of FIGS. 1A through 1C;

DETAILED DESCRIPTION

Figure 1A:
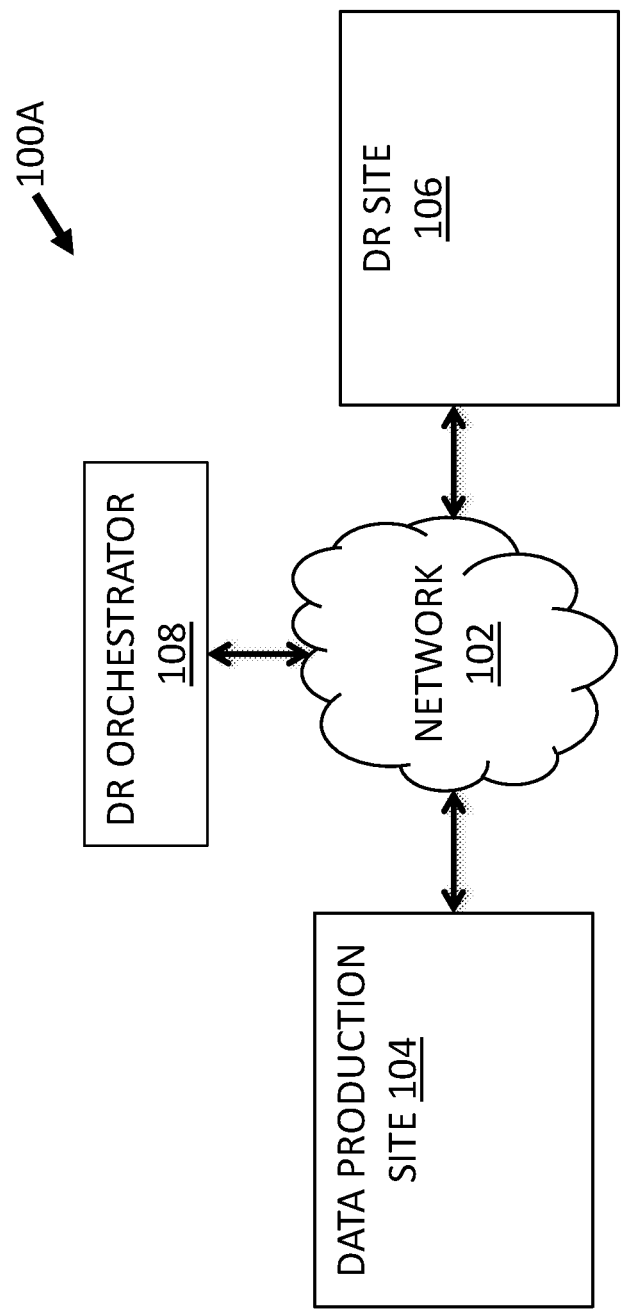
FIGS. 1A-1C are diagrams of various embodiments of a storage system.

Disclosed herein are various embodiments providing methods, systems, and computer program products that can integrate resources at a disaster recovery site. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

Methods, systems, and computer program products that can pre-emptively swap operations of a data production site to a disaster recovery (DR) site. A method includes providing, by a processor, one or more weighting factors to a set of metrics for an event occurring at a data production site based on information related to the event, analyzing the set of metrics based on the one or more weighting factors, and generating a recommendation related to swapping operations from the data production site to a DR site based on the analysis.

In various embodiments, the set of metrics comprises at least a probability that the event will occur metric, a severity of the event metric, an expected duration of the event metric, and/or an impact of the event metric. In additional or alternative embodiments, the method further includes determining an urgent situation or a non-urgent situation based on a predicted amount of time before the event occurs, providing the recommendation to a user in response to the non-urgent situation, and automatically swapping the data production site to the disaster recovery site in response to the urgent situation.

In further additional or alternative embodiments, the method includes retrieving information related to the event from an external source, and providing data to the weighting module. In some embodiments, the data comprises at least a portion of the retrieved information and the set of metrics and the external source includes a government agency, a social media entity, and/or a news entity.

One system includes a weighting module that provides one or more weighting factors to a set of metrics for an event occurring at a data production site based on information related to the event, an analysis module that analyzes the set of metrics based on the one or more weighting factors, and a pre-emptive module that generates a recommendation related to swapping operations from the data production site to a disaster recovery site based on the analysis. In some embodiments, at least a portion of the modules comprise hardware circuits, a programmable hardware device, and/or executable code stored on one or more computer-readable storage media.

In various embodiments, the pre-emptive module includes a swapping module that swaps the data production site to the disaster recovery site based on the analysis. In additional or alternative embodiments, the pre-emptive module further includes a timing module that determines one of an urgent situation and a non-urgent situation based on a predicted amount of time before the event occurs. In further additional or alternative embodiments, the pre-emptive module includes a decision module that prompts the pre-emptive module to provide the recommendation to a user in response to the non-urgent situation. In still further additional or alternative embodiments, the pre-emptive module includes a swapping module that automatically swaps the data production site to the disaster recovery site based on the analysis and a decision module that prompts the swapping module to automatically swap the data production site to the disaster recovery site in response to the urgent situation. In still further additional or alternative embodiments, the decision module is further configured to prompt the pre-emptive module to provide the recommendation to a user in response to the non-urgent situation.

In various embodiments, the set of metrics includes a probability that the event will occur metric, a severity of the event metric, an expected duration of the event metric, and/or an impact of the event metric. In some embodiments, the event is a natural disaster or a social conflict. In additional or alternative embodiments, the set of metrics includes at least two metrics. In further additional or alternative embodiments, at least two metrics include a same weighting factor and/or at least two metrics include different weighting factors.

The system, in various embodiments, further includes an information module that retrieves information related to the event from an external source and provides data to the weighting module in which the data includes at least a portion of the retrieved information and the set of metrics. In some embodiments, the external source includes a government agency, a social media entity, and/or a news entity.

Also disclosed are computer program products comprising a computer-readable storage medium including program instructions embodied therewith that can pre-emptively swap data production sites. Some program instructions are executable by a processor and cause the processor to provide one or more weighting factors to a set of metrics for an event occurring at a data production site based on information related to the event, analyze the set of metrics based on the one or more weighting factors; and generate a recommendation related to swapping operations from the data production site to a disaster recovery site based on the analysis.

In various embodiments, the set of metrics includes a probability that the event will occur metric, a severity of the event metric, an expected duration of the event metric, and/or an impact of the event metric. In additional or alternative embodiments, the program instructions further cause the processor to determine one of an urgent situation and a non-urgent situation based on a predicted amount of time before the event occurs, provide the recommendation to a user in response to the non-urgent situation, and automatically swap the data production site to the disaster recovery site in response to the urgent situation. In further additional or alternative embodiments, the program instructions further cause the processor to retrieve information related to the event from an external source and provide data to the weighting module.

In some embodiments, the data includes at least a portion of the retrieved information and the set of metrics. In additional or alternative embodiments, the external source includes a government agency, a social media entity, and/or a news entity.

Figure 1B:
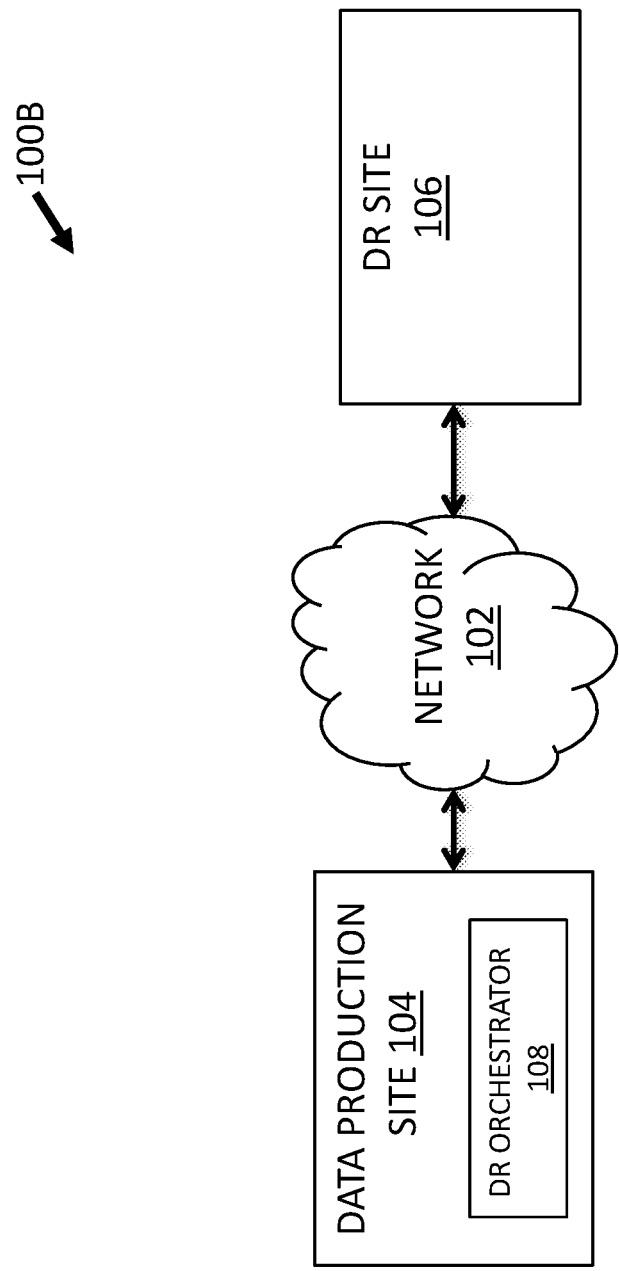
Figure 1C:
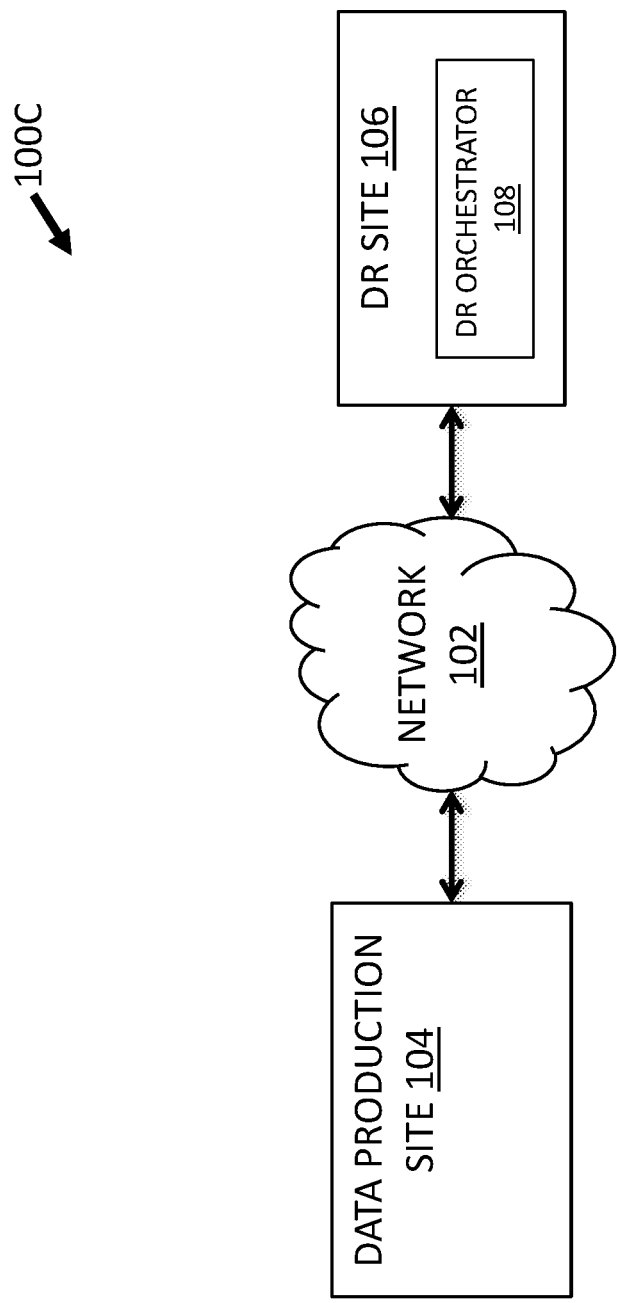

With reference now to the figures, FIGS. 1A-1C are diagrams illustrating various embodiments of storage systems 100A, 100B, and 100C, respectively, which can also be considered a storage network and can also simply be referred individually, in various groups, or collectively as storage system(s) 100. At least in the illustrated embodiment, the storage system 100A includes, among other components, a network 102 coupling a data production site 104 (e.g., a primary site), a disaster recovery (DR) site 106 (e.g., a backup site), and a DR orchestrator 108 to one another.

The network 102 may be any suitable wired and/or wireless network 102 (e.g., public and/or private computer networks in any number and/or configuration (e.g., the Internet, an intranet, a cloud network, etc.)) that is known or developed in the future that enables the data production site 104 and the DR site 106 to be coupled to and/or in communication with one another and/or to share resources. In various embodiments, the network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

Figure 2:
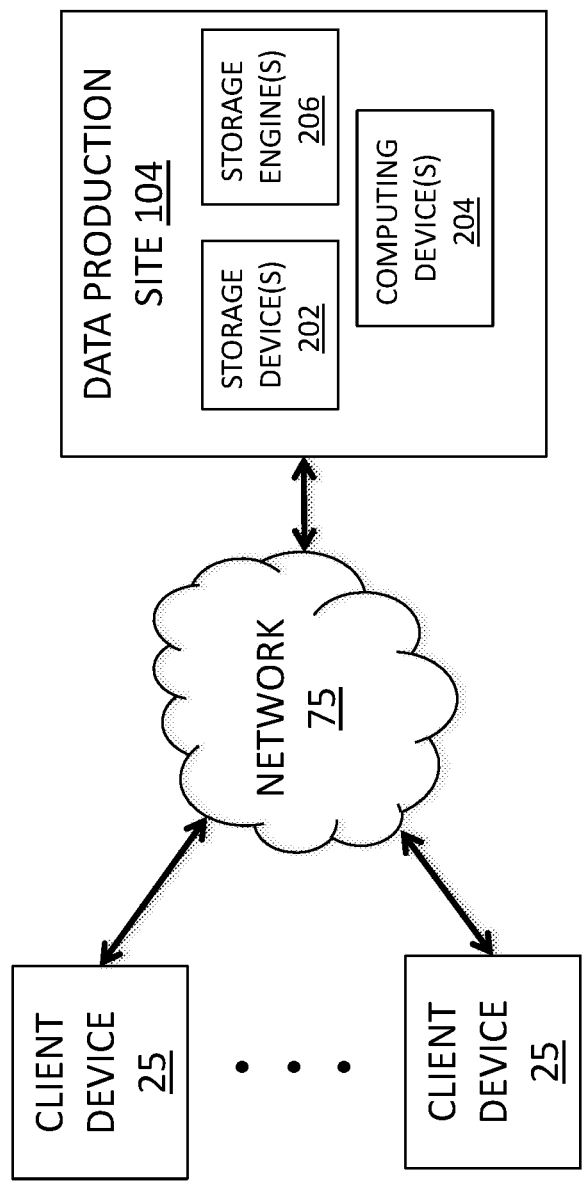
FIG. 2 is a block diagram of one embodiment of a data production site included in a storage system of FIGS. 1A through 1C.

With reference to FIG. 2, FIG. 2 is a block diagram of one embodiment of a data production site 104 (or system) included in the storage system 100 coupled to and/or in communication with a set of client devices 25. A client device 25 can be any computing hardware and/or software (e.g., a thick client, a thin client, or hybrid thereof) capable of accessing the data production site 104 via a network 75, which may be any type of network that is known or developed in the future.

Each client device 25, as part of its respective operation, relies on sending I/O requests to the data production site 104 to write data, read data, and/or modify data. Specifically, each client device 25 can transmit I/O requests to read, write, store, communicate, propagate, and/or transport instructions, data, computer programs, software, code, routines, etc., to the data production site 104 and may comprise at least a portion of a client-server model. In general, the data production site 104 can be accessed by the client device(s) 25 and/or communication with the data production site 104 can be initiated by the client device(s) 25 through a network socket (not shown) utilizing one or more inter-process networking techniques.

At least in the illustrated embodiment, the data production site 104 includes, among other components, a set of storage devices 202, a set of computing devices 204, and a set of storage engines 206 coupled to and/or in communication with one another. The storage devices 202 (also simply referred individually, in various groups, or collectively as storage device(s) 202) may be any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 202 may be implemented as a direct-access storage device (DASD). A storage device 202, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A set of computing devices 204 (also simply referred individually, in various groups, or collectively as computing device(s) 204) may include any type of hardware and/or software that is known or developed in the future that can perform computing operations. In various embodiments, the computing device(s) 204 can perform I/O operations related to one or more suitable services and/or applications, which can be any service and/or application that is known or developed in the future.

A set of storage engines 206 (also simply referred individually, in various groups, or collectively as storage engine(s) 206) may include non-volatile/persistent hardware and/or software configured to perform and/or facilitate long-term data storage operations on the storage devices 202, including, but not limited to, data archiving, data backup, data mirroring, replicating data, etc. For instance, a storage engine 206 may include non-volatile and/or persistent hardware and/or software to perform long-term data storage operations on the storage devices 202, which may include write operations, read operations, read-write operations, etc., among other operations that are possible and contemplated herein. In various embodiments, a storage engine 206 may communicate with the DR site 106 and/or a storage engine 306 in the DR site 106 to mirror, copy, and/or recover data between the data production site 104 and the DR site 106, as discussed elsewhere herein.

In various embodiments, a storage engine 206 may include any type of hardware and/or software that is known or developed in the future that can receive I/O requests (e.g., write request, read request, and/or read-write request, etc.) from the client device(s) 25 and perform corresponding I/O operations (e.g., write operations, read operations, and/or read-write operations, etc.) on the set of storage devices 202 in response thereto. A storage engine 206 may further include hardware and/or software for executing instructions in one or more applications to manage storage operations on the data production site 104 and/or the functionality of the set of storage devices 202.

In various embodiments, the storage engine(s) 206 can establish an initial replication relationship with the DR site 106 utilizing an initial replication mode. The storage engine (s) 206 may further include hardware and/or software to generate snapshots of the data, sets of data, subsets of data, etc. stored in the storage device(s) 202 and transmit the storage snapshots to the DR site 106 so that the data stored on the data production site 104 is mirrored/copied to the DR site 106.

Figure 3:
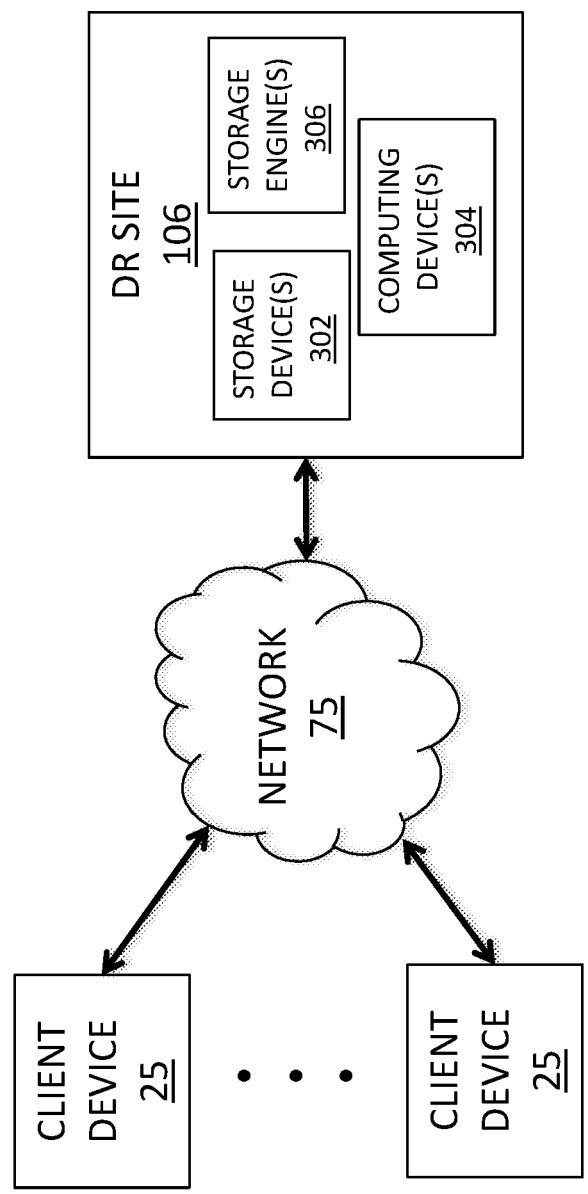
FIG. 3 is a block diagram of one embodiment of a disaster recovery (DR) site included in a storage system of FIGS. 1A through 1C.

With reference to FIG. 3, FIG. 3 is a block diagram of one embodiment of a DR site 106 (or backup site/system) included in a storage system/network 100. As shown, the DR site 106 can be coupled to and/or in communication with the set of client devices 25 via the network 75, although other embodiments contemplate that the DR site 106 may be coupled to and/or in communication with the client device(s) 25 via the data production site 104. Each client device 25, as part of its respective operation, can further rely on sending I/O requests to the DR site 106 to write data, read data, and/or modify data in the DR site 106 similar to the I/O requests directed to the data production site 104, as discussed elsewhere herein.

At least in the illustrated embodiment, the DR site 106 includes, among other components, a set of storage devices 302 and a set of computing devices 304 coupled to and/or in communication with one another similar to the storage device(s) 202 and the computing device(s) 204 in the data production site 104 discussed herein with reference to FIG. 2. The DR site 106 further includes a set of storage engines 306 (also simply referred individually, in various groups, or collectively as storage engine(s) 306) that may include any type of hardware and/or software that is known or developed in the future that can perform replication operations for the data production site 106 and/or receive I/O requests (e.g., write request, read request, and/or read-write request, etc.) from the client device(s) 25 and perform corresponding replication and/or I/O operations (e.g., write operations, read operations, and/or read-write operations, etc.) on the storage device(s) 302.

A storage engine 306 may include hardware and/or software for executing instructions in one or more applications to manage the DR site 106 and/or the functionality of the set of storage devices 302. In various embodiments, the storage engine(s) 306 may include hardware and/or software to receive the storage snapshot(s) from the data production site 104, which is/are a copy of the storage snapshot(s) on the data production site 104 so that the data stored on the data production site 104 is mirrored/copied to the DR site 106 (e.g., the storage device(s) 302 and/or at one or more suitable other storage locations on the DR site 106).

Referring now to FIG. 4, FIG. 4 is a diagram of one embodiment of a DR orchestrator 108 that can manage the exchange of data (e.g., copying/mirroring of data) to, from, and/or between the data production site 104 and the DR site 106, especially in the unlikely event that the data production site 104 becomes unavailable (e.g., power failure, goes offline, etc.). At least in the illustrated embodiment, a DR orchestrator 108 may include one or more processors 404 coupled to and/or in communication with one another, the data production site 104 and the DR site 106. Further, the process(s) 402 are configured to pre-emptively swap operations on the data production site 104 to the DR site 106 prior to a disaster occurring.

Figure 5A:
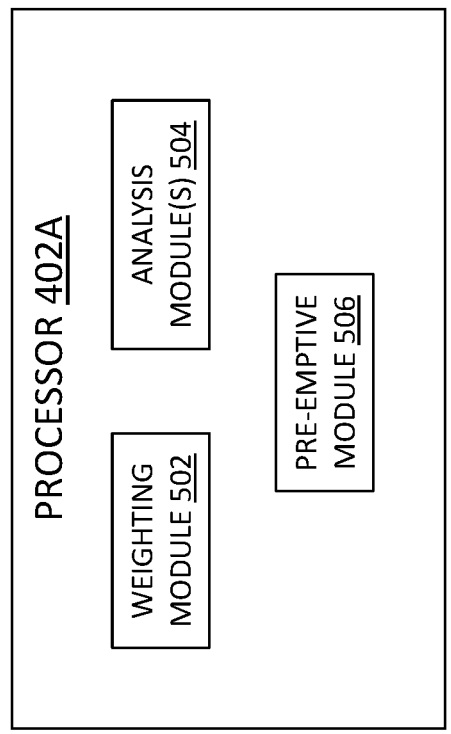
FIGS. 5A and 5B are block diagrams of various embodiments of a processor included in the DR orchestrator of FIG. 4.

With reference to FIG. 5A, FIG. 5A is a block diagram of one embodiment of a processor 404A that can be included in a DR orchestrator 108. At least in the illustrated embodiment, a processor 404A may include, among other components, a weighting module 502, one or more analysis modules 504, and a pre-emptive module coupled to and/or in communication with one another.

A weighting module 502 may include any suitable hardware and/or software that can provide one or more weighting factors to a set of disaster metrics related to a disaster event (also simply referred to herein as a disaster), which can include any suitable event that can cause a data production site 104 to become unavailable (e.g., power failure, goes offline, etc.). Examples of a disaster event can include, but are not limited to, a natural disaster (e.g., an earthquake, a hurricane, a volcano, excessive precipitation (e.g., a snow storm, an ice storm, heavy rains, etc.), a tsunami, excessive temperature (heat or cold), wild fire, lightning, tornado, high winds, flooding, avalanche, dust storms, and rockslide, etc., among other extreme naturally occurring conditions that are possible and contemplated herein), acts of terrorism, and social conflicts (e.g., social unrest, wars, rioting, coups, government hostility, and government overthrows, etc., among other types of social conflict are possible and contemplated herein), etc., among other types of events that are possible and contemplated herein that can cause the data production site 104 to become unavailable.

A set of disaster metrics can include one or more metrics related to and/or concerning a disaster. In various embodiments, a set of disaster metrics can include a plurality of metrics (e.g., two or more disaster metrics). Example disaster metrics can include, but are not limited to, a metric representing a probability that the disaster will occur, a metric representing a predicted and/or expected severity of the disaster, a metric representing a predicted and/or expected duration of the disaster (e.g., a power outage time period), and a metric representing a predicted and/or expected impact of the disaster, etc., among other types of disaster metrics that are possible and contemplated herein.

In various embodiments, a weighting module 502 may include hardware and/or software that can assign and/or provide weighting to one or more of the metric(s). In some embodiments, all of the metrics are weighted the same. In other embodiments, all of the metrics are weighted differently.

For example, a metric related to the severity of a disaster may be weighted more heavily than a metric related to the probability that the disaster will occur. In a non-limiting specific example, a tornado rated an F5 on the Fujita scale having a 20% percent chance of occurring at the data production site 104 may be given more weight than a F1 tornado having an 80% percent chance of occurring at the data production site 104.

In some embodiments, at least two metrics include the same weighting. In additional or alternative embodiments, at least two metrics are weighted differently. In further additional or alternative embodiments, at least two metrics are weighted the same and at least two metrics are weighted differently.

For example, a metric related to the severity and duration of a disaster may be weighted more heavily than one or more other metrics. In an additional or alternative non-limiting example, a metric related to the duration and impact of a disaster may be weighted less heavily than one or more other metrics.

In some embodiments, a weighting module 502 may weight historical data related to a disaster metric more heavily than current information for the disaster metric or vice-versa. In other embodiments, a weighting module 502 may provide equal weight to historical data and current information for a disaster metric.

In additional or alternative embodiments, a weighting module 502 can weight historical data related to one or more disaster metrics more heavily than current information for the disaster metric(s) and weight current information related to one or more disaster metrics more heavily than historical data for one or more other disaster metric(s). For example, current information related to the predicted severity of a current category 3 hurricane may be given more weight than the historical data related to the severity of a category 3 hurricane, while the historical duration of a category 3 hurricane may be given more weight than the predicted duration of the current category 3 hurricane.

In various embodiments, a weighting module 502 can provide the same or different weight to the same data and/or current information depending on the source of the data and/or current information. In some embodiments, the weighting may be based on the reliability and/or perceived reliability of the data and/or current information. For example, a report of an act of terrorism obtained from a news agency may be considered/perceived as more reliable, and thus given more weight, than the act of terrorism being reported on social media. Conversely, a terrorist group threatening violence in the near future on social media may be deemed more reliable, and thus given more weight, than a government agency reporting that there is no anticipated threat of violence from any terrorist group.

While the above examples are helpful in understanding the concept, scope, and/or spirit of the various embodiments of a weighting module 502, other weighting scenarios are possible in addition to the above examples, each of which is/are contemplated herein. That is, the various embodiments are not limited to the above examples, but rather, the concept, scope, and/or spirit of the various embodiments includes every possible weighting scenario.

An analysis module 504 can include any suitable hardware and/or software that can analyze a disaster event in view of the weighting provided by a weighting module 502. In some embodiments, the analysis performed by an analysis module 504 can provide the basis upon which a recommendation whether to swap operations from a data production site 104 to a DR site 106 is generated and provided to a user and/or is automatically swapped, as discussed elsewhere herein. That is, an analysis module 504 can calculate and/or generate a disaster index and provide the disaster index to a pre-emptive module 506, from which the pre-emptive module 506 can provide a swap recommendation and/or make a decision whether to swap from a data production site 104 to a DR site 106.

In various embodiments, an analysis module 504 can store data related to one or more disasters. The data, in some embodiments, can be historical information related to one or more types of disaster. For each type of disaster, the historical data may include, but is not limited to, the severity of this type of disaster in the past, the duration of this type of disaster in the past, and/or the impact that this type of the disaster has in the past, etc., among other types of relevant and/or suitable historical data that are possible and contemplated herein.

In some embodiments, the historical data may include the average value(s) related to the severity, duration, and/or impact for one or more particular disasters over a predetermine amount of time. In additional or alternative embodiments, the data may include a historical range of values over the predetermined time period related to the severity, duration, and/or impact for one or more particular disasters. In further additional or alternative embodiments, the data may include the historical median value(s) related to the severity, duration, and/or impact for the disaster(s) over the predetermine amount of time.

In additional or alternative embodiments, the data can include data related to the types of disaster that can be and/or have historically occurred at or proximate to a data production site 104 and/or in areas/regions similar to the area/region where the data production site 104 is located. For example, an analysis module 504 for a data production site in Phoenix, Ariz. may include data related to extreme heat, dust storms, and/or possibly flooding since a data production site 104 located in Phoenix, Ariz. may experience such disasters, but is unlikely to experience a hurricane and tsunami since Phoenix, Ariz. is not located proximate to a sea coast.

An analysis module 504, in some embodiments, can be in communication with one or more external sources of information. The information obtained from the external source(s) can be current information related to one or more disasters. In some embodiments, the information obtained from the external source(s) can include, in real-time, the probability and/or likelihood that a particular disaster at issue will occur at a data production site 104, which probability can change over time.

Further, the external source(s) can provide relevant information related to a current disaster and/or a disaster that is predicted to occur at or proximate to a data production site. The relevant information may include the type of disaster(s), the predicted/expected severity for the disaster(s), the predicted/expected duration of the disaster(s), and/or the predicted/expected impact of the disaster(s), etc., among other types of relevant and/or suitable information that is possible and contemplated herein.

An analysis module 504, in various embodiments, can further include hardware and/or software that can calculate and/or quantify a disaster index based on the historical data related to one or more current, pending, approaching, and/or suspected disaster(s) and/or based on information (e.g., current information) related to the current, pending, approaching, and/or suspected disaster(s) obtained from the external source(s).

In various embodiments, a disaster index may be obtained by providing a value to one or more disaster metrics for a particular type of disaster and performing a calculation based on the value(s). The calculation may be any suitable type of calculation that can provide a value, prediction, and/or indication of the potential for damage, the extent of potential damage, and/or duration of potential damage that may be inflicted on a data production site 104 that could cause the data production site to become at least temporarily unavailable. In some embodiments, one or more disaster metrics in the calculation may be skewed and/or weighted by a weighting module 502 that can provide one or more weighting factors to one or more of the disaster metrics in the disaster index, as discussed elsewhere herein.

A disaster index, in various embodiments, may include a numeric value, which can be any suitable numeric value. In some embodiments, the numeric value is a value in a predetermined range of values, which can be any suitable range of values. Further, the range of values may include a suitable size. Non-limiting example value ranges can include, but are not limited to, (0, 1], (0, 1000], and (0, 10000], etc., among other ranges of values and/or range sizes that are possible and contemplated herein.

In various embodiments, the disaster index for each type of disaster scenario may be obtained using the same calculation or a different calculation depending on the type of disaster. For example, a disaster index for a hurricane and a tsunami may be obtained using the same calculation since hurricanes and tsunami can include similar characteristics in terms of predictability, severity, extent of damage, and/or duration, while the disaster indices of a terrorist attack and a flood may be obtained using different calculations since terrorist attacks and flooding can be dissimilar in terms of predictability, severity, extent of damage, and/or duration.

Further, the disaster index for each type of disaster scenario may be obtained from a calculation using the same disaster metrics, one or more of the same disaster metrics, one or more different disaster metrics, or totally different disaster metrics depending on the type of disaster. For example, the disaster indices for a hurricane and a flood may be obtained using a calculation that includes one or more of the same disaster metrics and/or one or more different disaster metrics because hurricanes can include some similar characteristics (e.g., flooding) and/or differing characteristics (e.g., predictability).

In some embodiments, the disaster index for each type of disaster may be obtained by performing the same calculation based on the same disaster metrics. In other embodiments, the disaster index for each type of disaster may be obtained by performing the same calculation based on at least two of the same disaster metrics. In still other embodiments, the disaster index for each type of disaster may be obtained by performing the same calculation based on at least two different disaster metrics. In yet other embodiments, the disaster index for each type of disaster may be obtained by performing the same calculation based on completely different disaster metrics.

The disaster index for each type of disaster, in further embodiments, may be obtained by performing a different calculation based on the same disaster metrics. In other embodiments, the disaster index for each type of disaster may be obtained by performing a different calculation based on at least two of the same disaster metrics. In still other embodiments, the disaster index for each type of disaster may be obtained by performing a different calculation based on at least two different disaster metrics. In yet other embodiments, the disaster index for each type of disaster may be obtained by performing a different calculation based on completely different disaster metrics.

In some embodiments, an analysis module 504 can generate a first disaster index at a first time and a second disaster index at a subsequent time (e.g., generated in series) and/or the first disaster index and the second disaster index can be generated at the same time or at substantially the same time (e.g., generated in parallel). The disaster indices may utilize the same or different calculations and/or disaster metrics to generate the disaster indices.

In additional or alternative embodiments, a first analysis module 504 can generate a first disaster index at a first time and a second analysis module 504 can generate a second disaster index at a subsequent time (e.g., generated in series). In further additional or alternative embodiments, a first analysis module 504 can generate a first disaster index and a second analysis module 504 can generate a second disaster index at the same or substantially the same time (e.g., generated in parallel). The disaster indices may utilize the same or different calculations and/or disaster metrics to generate their respective disaster indices.

While the above examples are helpful in understanding the concept, scope, and/or spirit of the various embodiments of an analysis module 504, other analysis scenarios are possible in addition to the above examples, each of which is/are contemplated herein. That is, the various embodiments are not limited to the above examples, but rather, the concept, scope, and/or spirit of the various embodiments includes every possible analysis scenario to obtain a disaster index and/or analyze a disaster event to determine/predict the impact and/or potential impact on a data production site 104.

A pre-emptive module 506 may be any suitable hardware and/or software that can be coupled to and/or in communication with a user and generate a recommendation regarding whether to swap operations from a data production site 104 to a DR site 106 based on one or more disaster indices calculated and/or generated by an analysis module 504. The recommendation may then be provided to the user and the user can make a decision whether to make the swap from the data production site 104 to the DR site 106. A pre-emptive module 506, in some embodiments, can further automatically (e.g., on-the-fly) and/or unilaterally make the swap from the data production site 104 to the DR site 106 in certain situations.

In various embodiments, a recommendation generated by a pre-emptive module 506 is based on one or more factors. In some embodiments, at least one factor can be a disaster index generated by an analysis module 504, among other factors that are possible and contemplated herein.

Figure 6:
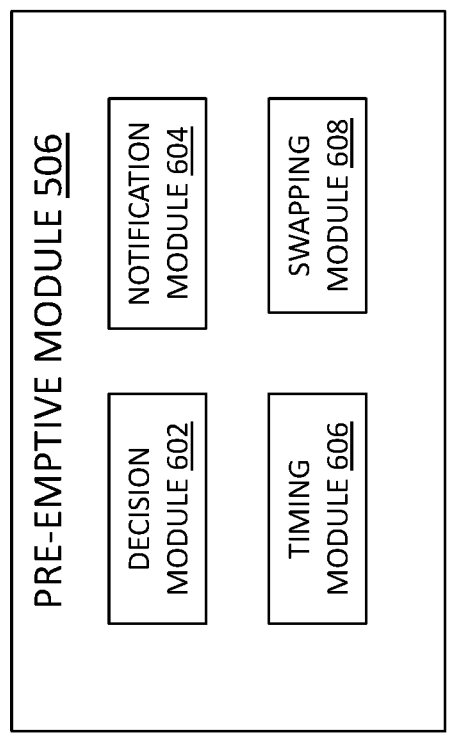
FIG. 6 is a block diagram of one embodiment of a pre-emptive module included in the processor(s) of FIGS. 5A and 5B.

Referring to FIG. 6, Figure is a block diagram of one embodiment of a pre-emptive module 506. At least in the illustrated embodiment, the pre-emptive module 506 includes a decision module 602, a notification module 604, a timing module 606, and a swapping module 608 coupled to and/or in communication with one another.

A decision module 602 may include any suitable hardware and/or software that can generate a recommendation and provide the recommendation to a user. A recommendation may include any suitable course of action that a user may take in determining whether to swap the operations of a data production site 104 to a DR site 106.

In various embodiments, a swap recommendation may include a course of action to swap the operations (e.g., a swap recommendation) or not swap the operations (e.g., a maintain recommendation) from the data production site 104 to the DR site 106. In additional or alternative embodiments, a recommendation may include a course of action to at least temporarily put a hold on swapping operations (e.g., a hold recommendation).

In some embodiments, a hold recommendation may include a course of action to not immediately swap operations, but to wait for a predetermined amount of time to pass prior to swapping operations. In additional or alternative embodiments, a hold recommendation may include a course of action to not immediately swap operations, but to swap operations upon the occurrence of a predetermined event and/or a change in one or more disaster metrics (e.g., an increase in probability, an increase in intensity, etc.). In further additional or alternative embodiments, a hold recommendation may include a course of action to wait until further information is obtained and/or a subsequent swap recommendation is issued.

A decision module 602 can generate a swap recommendation, a maintain recommendation, and/or a hold recommendation based on where the value of a disaster index lie(s) within a range of values. In some embodiments, a swap recommendation may be generated in response to a disaster index being greater than, less than, or equal to a predetermined value in a range of values, which disaster index can be considered to represent an urgent situation. For example, a decision module 602 can generate a swap recommendation in response to a disaster index being greater than, less than, or equal to 0.5 for a range of values of (0, 1], among other values and/or ranges of values that are possible and contemplated herein.

In additional or alternative embodiments, a maintain recommendation may be generated in response to the disaster index being greater than, less than, or equal to a predetermined value in a range of values, which can be considered a non-urgent situation. For example, a decision module 602 can generate a swap recommendation in response to a disaster index being greater than, less than, or equal to 650 for a range of values of (0, 1000], among other values and/or ranges of values that are possible and contemplated herein.

In further additional or alternative embodiments, a hold recommendation may be generated in response to the disaster index being equal to and/or within a predetermined range in a range of values. For example, a decision module 602 can generate a hold recommendation in response to a disaster index being a value equal to and/or within the range of 4800 to 5200 for a range of values of (0, 10000], among other values, maintain ranges, and/or ranges of values that are possible and contemplated herein.

In various embodiments, a swap recommendation, a maintain recommendation, and/or a hold recommendation can be based on two or more disaster indices (e.g., a plurality of disaster indices), which can be received and/or generated in parallel and/or in series with respect to each other by the same or different analysis modules 504. In some embodiments, a swap recommendation, a maintain recommendation, and/or a hold recommendation can be based on the average value, the median value, and/or the mode value of a plurality of disaster indices.

In a specific non-limiting example, for a disaster index including a calculated value (or average value, median value, or mode value) in the range of (0, 100), a decision module 602 can generate a swap recommendation in response to the disaster index being greater than 82, generate a maintain recommendation in response to the disaster index being less than 75, and generate a hold recommendation in response to the disaster index being in the range of [75, 82], among other values, maintain ranges, and/or ranges of values that are possible and contemplated herein. The decision module 602 can provide the recommendation that it generated to a notification module 604.

A notification module 604 may include any suitable hardware and/or software that can provide a recommendation from a decision module 602 (e.g., a swap recommendation, a maintain recommendation, and a hold recommendation) to a user. That is, a notification module 604 can provide one or more visual cues, one or more audible cues, and/or one or more tactile cues to a user that can convey a recommendation to the user.

A timing module 606 may include any suitable hardware and/or software that can determine and/or predict the occurrence of a disaster. In some embodiments, a timing module 606 can determine/predict an approximate time and/or the time that a disaster will strike based on the current information obtained by an information module 508 from one or more external sources of current information (see FIG. 5B).

In various embodiments, a timing module 606 can generate a timing metric that represents the approximate time and/or the time that the disaster will strike. The timing metric, in some embodiments, can include an indication of whether the disaster will strike before or after a predetermined threshold amount of time. The predetermined threshold amount of time may be any suitable amount of time that can enable the operations of a data production site 104 to be successfully and/or completely swapped or transferred to a DR site 106. In some embodiments, the predetermined threshold amount of time can be any suitable amount of time that can enable at least a portion of the operations of a data production site 104 to be swapped or transferred to a DR site 106. In additional or alternative embodiments, the portion(s) of the operations may include operations and/or data with a priority level greater than a predetermined priority level, which can be any suitable priority level.

A swapping module 608 may include any suitable hardware and/or software that can swap the operations of a data production site 104 to a DR site 106. In various embodiments, the swapping module 608 can swap the operations of the data production site 104 to the DR site 106 in response to a command from a user (e.g., a user command) and/or can unilaterally swap the operations of the data production site 104 to the DR site 106.

In various embodiments, a swapping module 608 can automatically (and unilaterally) swap the operations of the data production site 104 to the DR site 106 in response to a disaster index being greater than, less than, or equal to a predetermined value in a range of values, which can be considered an urgent situation. Here, the value in the range of values prompting the swapping module 608 to automatically/unilaterally swap the operations of the data production site 104 to the DR site 106 may be the same value or a different value in the range of values that result in a decision module 602 generating a swap recommendation.

In some embodiments, a swapping module 608 can automatically (and unilaterally) swap the operations of the data production site 104 to the DR site 106 in response to a disaster index being greater than, less than, or equal to the predetermined value in the range of values and the timing metric including a value and/or indication that the disaster will strike within a predetermined amount of time, which can be considered an urgent situation. In some embodiments, the value in the range of values prompting the swapping module 608 to automatically/unilaterally swap the operations of the data production site 104 to the DR site 106 when the timing metric indicates that the disaster will strike within the predetermined amount of time may be the same value in the range of values that result in a decision module 602 generating a swap recommendation.

In other embodiments, the value in the range of values prompting the swapping module 608 to automatically/unilaterally swap the operations of the data production site 104 to the DR site 106 when the timing metric indicates that the disaster will strike within the predetermined amount of time may be a different value in the range of values that result in a decision module 602 generating a swap recommendation. The different value may be greater than or less than the value that result in a decision module 602 generating a swap recommendation.

In various embodiments, the value that prompts the swapping module 608 to automatically/unilaterally swap the operations of the data production site 104 to the DR site 106 can be more strict or less strict than the value that results in a decision module 602 generating a swap recommendation. In some embodiments, the level of strictness can be based on the amount of time remaining before the disaster strikes. That is, as the amount of time before the disaster strikes decreases, the value that triggers and/or prompts the swapping module 608 to automatically/unilaterally swap the operations of the data production site 104 to the DR site 106 becomes less strict or looser.

The degree to which the strictness relaxes can be proportional and/or exponential, etc. in relation to the time remaining, among other mathematical operations that are possible and contemplated herein. For example, the level of strictness may decrease proportionally in response to the time remaining being greater than a threshold amount of time and then decrease exponentially in response to the time remaining being less than the threshold amount of time.

In various embodiments, a swapping module 608 will not automatically/unilaterally swap the operations from the data production site 104 to the DR site 106 when the one or more disaster indices do not trigger a swap recommendation and/or when greater than a predetermined threshold of time remains before the disaster will strike. In other words, the swapping module 608 will not automatically/unilaterally swap the operations from the data production site 104 to the DR site 106 in response to a non-urgent situation.

Figure 5B:
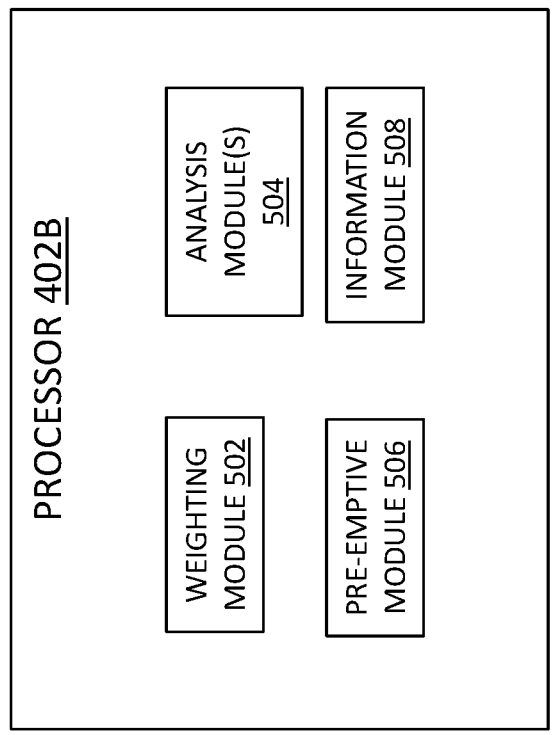

With reference to FIG. 5B, FIG. 5B is a block diagram of another embodiment of a processor 402B that can be included in a DR orchestrator 108. A processor 402B may include a weighting module 502, one or more analysis modules 504, and a pre-emptive module 506 coupled to and/or in communication with one another similar to the processor 402A discussed with reference to FIG. 5A. The processor 402B, at least in the illustrated embodiment, further includes an information module 508 coupled to and/or in communication with the weighting module 502, analysis module 504, and pre-emptive module 506.

An information module 508 may include any suitable hardware and/or software that can be coupled to and/or in communication with one or more suitable external sources of information. Examples of suitable external sources of information can include, but are not limited to, a government agency (e.g., the National Weather Service (NWS), the Federal Aviation Administration (FAA), etc.), a social media entity (e.g., Facebook®, Twitter®, LinkedIn®, etc.), a news agency (e.g., a television news outlet, a radio news outlet, an internet news outlet, a printed news outlet, etc.), a private entity (e.g., weather.com, etc.), etc., among other external sources of information from which current information related to one or more disasters and/or disaster metrics can be obtained.

For example, an information module 508 may obtain weather information from the NWS, the FAA, a news agency, and/or weather.com, etc. Continuing, the information module 508 may additionally or alternatively, obtain current news information from a social media entity, government agency, and/or news agency regarding social conflict/social unrest (e.g., rioting, protesting, etc.), governments (e.g., government hostilities, stability, etc.), economics, and/or terrorism, etc., among other current information that may be a predictor and/or an indication of a disaster that is/are possible and contemplated herein.

In various embodiments, the current information obtained from the external source(s) may form at least a portion of a disaster metric. In some embodiments, the current information can be translated into a value or indication for inclusion in a disaster metric for use in calculating a disaster index. The value may be any suitable type of value and/or quantity than can used in a calculation to generate one or more disaster indices.

Referring to FIG. 1B, FIG. 1B is a block diagram of another embodiment of a storage system 100B. A storage system 100B may be similar to the storage system 100A, except that the DR orchestrator 108 is included on and/or forms a portion of the data production site 104. In FIG. 1C, a storage system 100C may be similar to the storage systems 100A and/or 100B, except that the DR orchestrator 108 is included on and/or forms a portion of the DR site 106.

Figure 7:
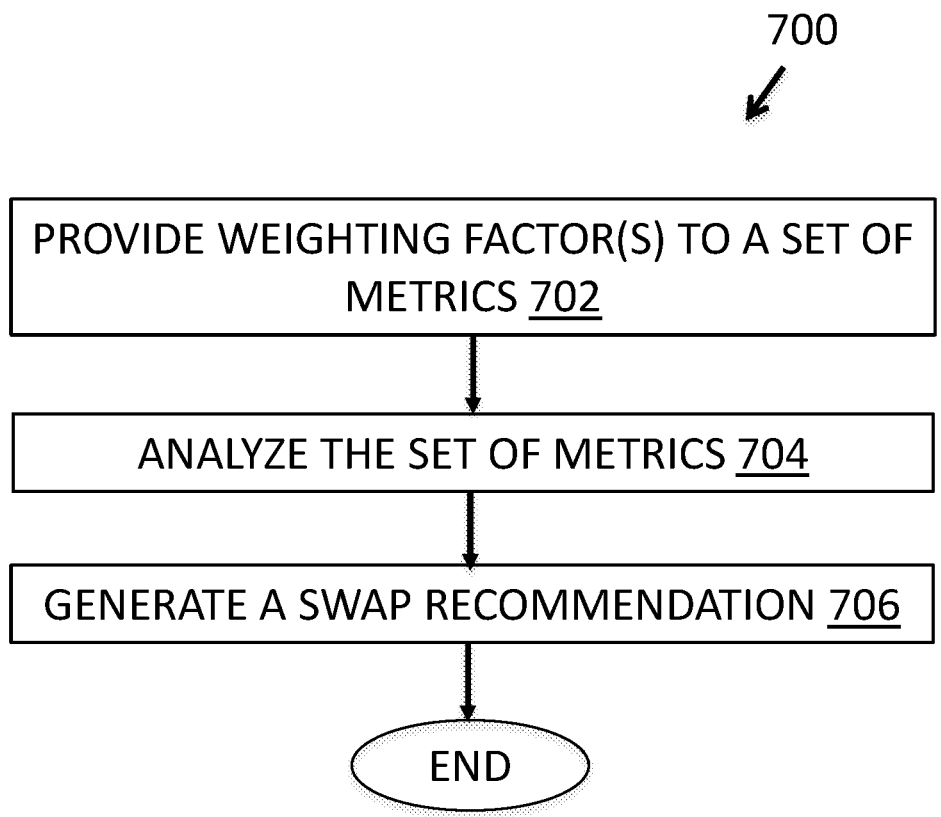
FIG. 7 is a schematic flow chart diagram illustrating one embodiment of a method for pre-emptively swapping data production sites.

With reference to FIG. 7, FIG. 7 is a schematic flow chart diagram illustrating one embodiment of a method 700 for pre-emptively swapping operations of a data production site to a DR site. At least in the illustrated embodiment, method 700 begins by one or more processors (e.g., processor 402A and/or processor 402B (simply referred to individually, in various groups, or collectively as processor(s) 402)) providing one or more weighting factors to a set of disaster metrics (block 702). The disaster metric(s) can be based on one or more characteristics of a disaster, as discussed elsewhere herein.

The processor 402 can analyze the set of metrics to generate one or more disaster indices (block 704). The one or more disaster indices may be generated using one or more calculations including the disaster metric(s), as discussed elsewhere herein.

The processor 402 can then generate a recommendation related to swapping operations from a data production site 104 to a disaster recovery site 106 based on the analysis (e.g., a calculated disaster index) (block 706). The recommendation may include a swap recommendation, a maintain recommendation, or a hold recommendation, as discussed elsewhere herein.

With reference to FIG. 7, FIG. 7 is a schematic flow chart diagram illustrating one embodiment of a method 700 for pre-emptively swapping operations of a data production site 104 to a DR site 106. At least in the illustrated embodiment, method 700 begins by one or more processors (e.g., processor 402A and/or processor 402B (simply referred to individually, in various groups, or collectively as processor(s) 402)) providing one or more weighting factors to a set of disaster metrics (block 702). The disaster metric(s) can be based on one or more characteristics of a disaster, as discussed elsewhere herein.

The processor 402 can analyze the set of metrics to generate one or more disaster indices (block 704). The one or more disaster indices may be generated using one or more calculations including the disaster metric(s), as discussed elsewhere herein.

The processor 402 can then generate a recommendation related to swapping operations from a data production site 104 to a disaster recovery site 106 based on the analysis (e.g., a calculated disaster index) (block 706). The recommendation may include a swap recommendation, a maintain recommendation, or a hold recommendation, as discussed elsewhere herein. The method 700 can then end.

Figure 8:
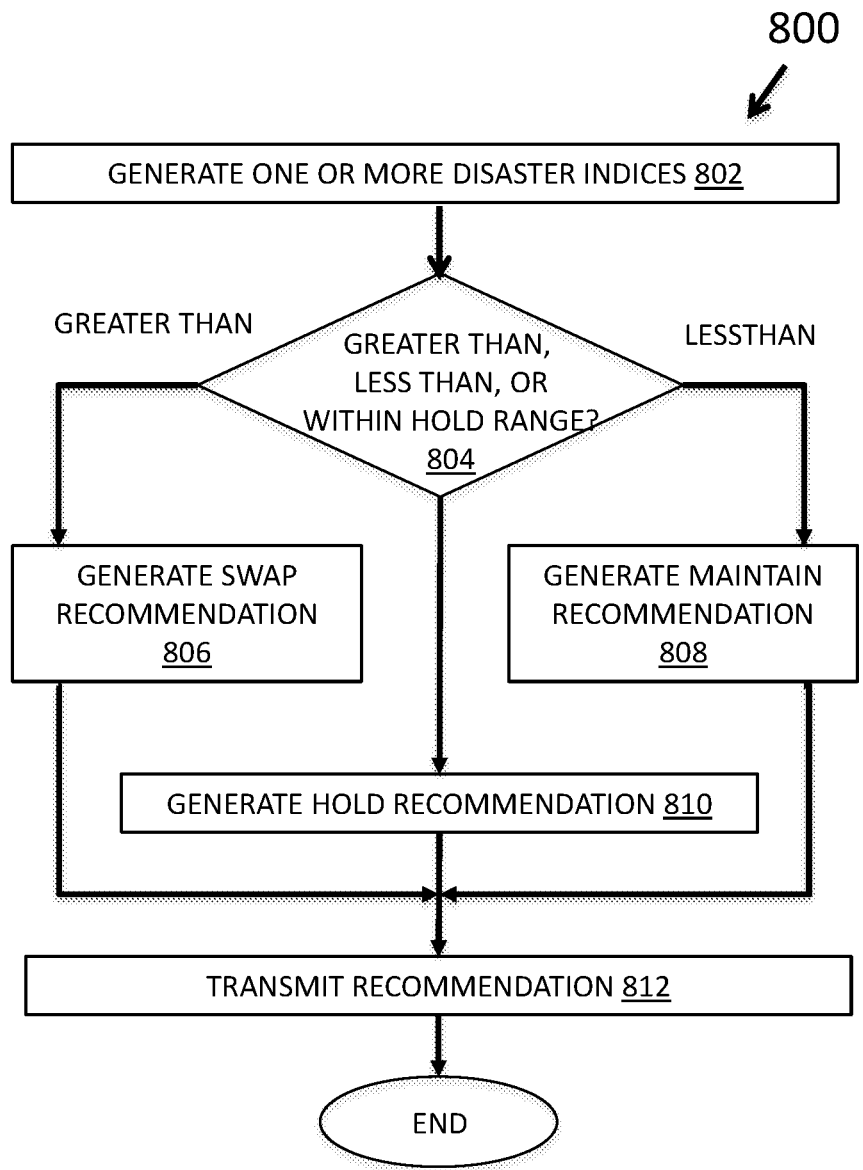
FIG. 8 is a schematic flow chart diagram illustrating another embodiment of a method for pre-emptively swapping data production sites.

With reference to FIG. 8, FIG. 8 is a schematic flow chart diagram illustrating another embodiment of a method 800 for pre-emptively swapping operations of a data production site 104 to a DR site 106. At least in the illustrated embodiment, method 800 begins by one or more processors (e.g., processor 402A and/or processor 402B (simply referred to individually, in various groups, or collectively as processor(s) 402)) generating one or more disaster indices (simply referred to individually, in various groups, or collectively as a disaster index) based on a weighted or non-weighted set of disaster metrics (block 802). The disaster metric(s) can be based on one or more characteristics of a disaster, as discussed elsewhere herein.

The processor 402 can then determine whether the disaster index is greater than or less than a predetermined threshold value or within a range of hold values (block 804). In response to the disaster index being greater than the predetermined threshold value, the processor 402 generates a swap recommendation (block 806) and transmits the swap recommendation to a user (block 812). In response to the disaster index being less than the predetermined threshold value, the processor 402 generates a maintain recommendation (block 808) and transmits the maintain recommendation to the user (block 812). In response to the disaster index being within the range of hold values, the processor 402 generates a hold recommendation (block 810) and transmits the hold recommendation to the user (block 812). The method 800 can then end.

While method 800 discusses various operations based on values being greater than and less than a predetermined value, method 800 is not limited to such discussion. That is, various embodiments contemplated that the various operations may be performed in response to the opposite result occurring. That is, the swap recommendation generated in block 806 may occur in response to the disaster index being less than the predetermined value and the maintain recommendation generated in block 808 may occur in response to the disaster index being less than the predetermined value.

Figure 9:
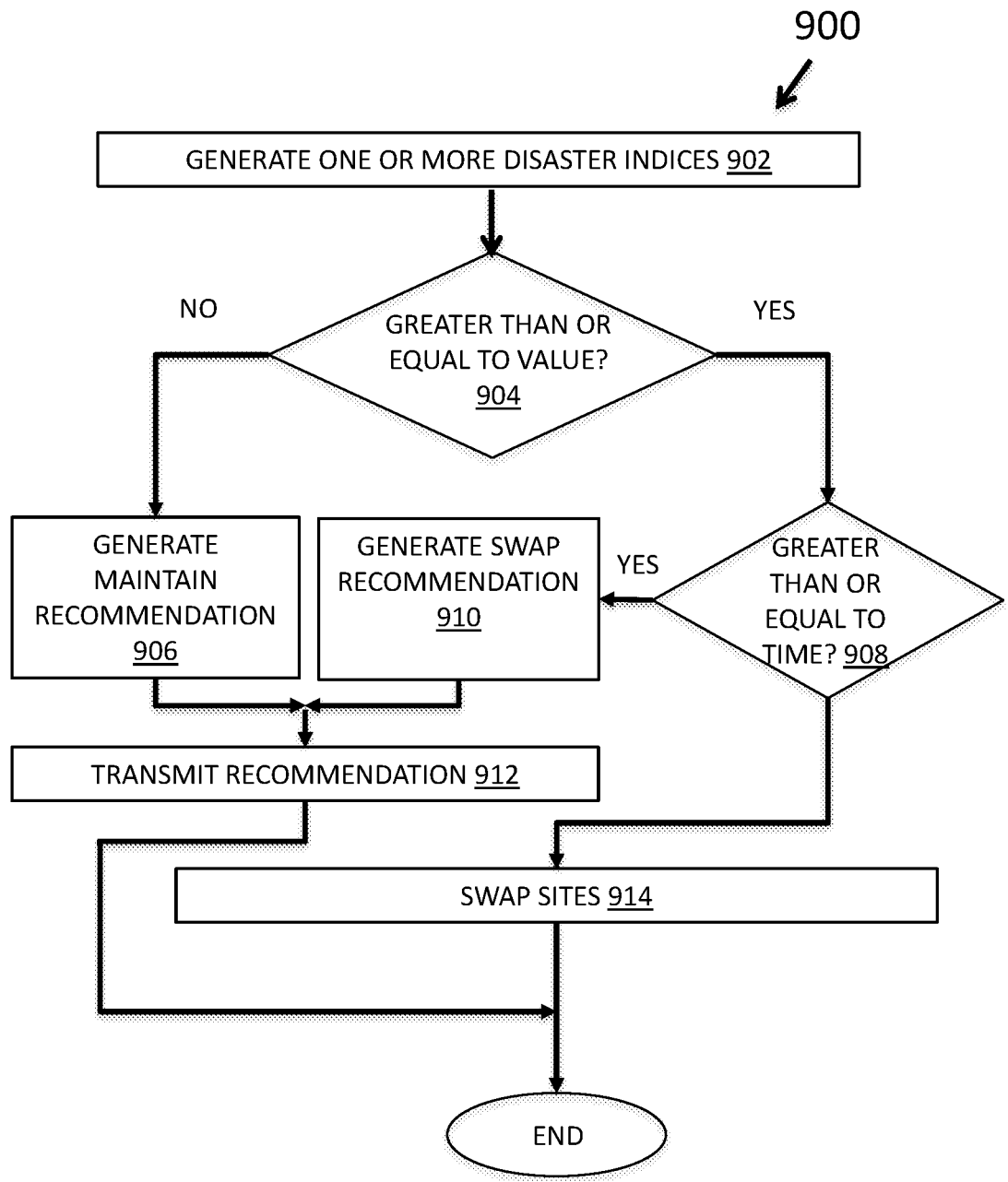
FIG. 9 is a schematic flow chart diagram illustrating still another embodiment of a method for pre-emptively swapping data production sites.

With reference to FIG. 9, FIG. 9 is a schematic flow chart diagram illustrating still another embodiment of a method 900 for pre-emptively swapping operations of a data production site 104 to a DR site 106. At least in the illustrated embodiment, method 900 begins by one or more processors (e.g., processor 402A and/or processor 402B (simply referred to individually, in various groups, or collectively as processor(s) 402)) generating one or more disaster indices (simply referred to individually, in various groups, or collectively as a disaster index) based on a weighted or non-weighted set of disaster metrics (block 902). The disaster metric(s) can be based on one or more characteristics of a disaster, as discussed elsewhere herein.

The processor 402 can then determine whether the disaster index is greater than/equal to or less than a predetermined threshold value (block 904). In response to the disaster index being less than the predetermined threshold (e.g., a "NO" in block 904), the processor 402 generates a maintain recommendation (block 906) and transmits the maintain recommendation to a user (block 912). In response to the disaster index being greater than the predetermined threshold value (e.g., a "NO" in block 904), the processor 402 determines whether there is greater than a predetermine amount of time left before the disaster strikes (block 908).

In response to the amount of time before the disaster strikes being greater than the predetermined threshold amount of time (e.g., a "YES" in block 908), the processor 402 generates a swap recommendation (block 910) and transmits the swap recommendation to the user (block 912). In response to the amount of time before the disaster strikes being less than or equal to the predetermined threshold amount of time (e.g., a "NO" in block 906), the processor 402 automatically and/or unilaterally swaps the operations from the data production site 104 to the DR site 106 (block 914). The method 900 can then end.

While method 900 discusses various operations based on values being greater than and less than a predetermined value, method 900 is not limited to such discussion. That is, various embodiments contemplated that the various operations may be performed in response to the opposite result occurring. That is, the swap recommendation generated in block 910 may occur in response to the disaster index being less than the predetermined value and the predetermined threshold amount of time before the disaster strikes being greater than the threshold amount. Similarly, the maintain recommendation generated in block 906 may occur in response to the disaster index being greater than the predetermined value.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A system, comprising:
a weighting module that provides one or more weighting factors related to a set of metrics for a potential event occurring at a data production site based on information related to the potential event, wherein:
the set of metrics comprises a first metric that includes one of a plurality of severity levels for the potential event and a second metric that includes a probability of the potential event occurring,
the plurality of severity levels comprises at least two severity levels greater than a severity level of zero, and
a weighting factor provides greater weight to the first metric than to the second metric to produce a weighted first metric;
an analysis module that analyzes the potential event utilizing the set of metrics including the weighted first metric to determine a basis for a recommendation to swap operations from the data production site to a disaster recovery site; and
a swapping module that swaps operations from the data production site to the disaster recovery site prior to an actual event corresponding to the potential event occurring at the data production site based on the recommendation,
wherein:
the potential event is one of a natural disaster and a social conflict, and
at least a portion of said modules comprise one or more of hardware circuits, a programmable hardware device, and executable code stored on one or more computer-readable storage media.

2. The system of claim 1, further comprising:
a pre-emptive module that generates the recommendation, wherein:
the recommendation is related to swapping the operations from the data production site to the disaster recovery site based on the analysis, and
the pre-emptive module comprises a timing module that determines one of an urgent situation and a non-urgent situation based on a predicted amount of time before the event occurs.

3. The system of claim 2, wherein the pre-emptive module further comprises:
a decision module that prompts the pre-emptive module to provide the recommendation to a user in response to the non-urgent situation.

4. The system of claim 2, wherein:
the pre-emptive module further comprises a decision module that prompts the swapping module to swap the data production site to the disaster recovery site in response to the urgent situation; and
the swapping module is configured to automatically swap the data production site to the disaster recovery site in response to the prompt.

5. The system of claim 4, wherein the decision module is further configured to prompt the pre-emptive module to provide the recommendation to a user in response to the non-urgent situation.

6. The system of claim 1, wherein the set of metrics further comprises at least one of:
a third metric that includes an expected duration of the potential event; and
a fourth metric that includes an impact of the potential event.

7. The system of claim 1, wherein the potential event is the natural disaster.

8. The system of claim 6, wherein the set of metrics further comprises the third metric and the fourth metric.

9. The system of claim 8, wherein one of:
the third metric and the fourth metric include a same weighting factor; and
the third metric and the fourth metric include different weighting factors.

10. The system of claim 1, further comprising:
an information module that retrieves information related to the potential event from an external source and provides data to the weighting module,
wherein the data comprises at least a portion of the retrieved information, the first metric, and the second metric.

11. The system of claim 10, wherein the external source comprises at least one of:
a government agency;
a social media entity; and
a news entity.

12. The system of claim 1, further comprising:
a pre-emptive module that generates the recommendation, wherein:
the recommendation is related to swapping the operations from the data production site to a disaster recovery site based on the analysis, and
the pre-emptive module comprises the swapping module.

13. A method, comprising:
providing, by a processor, one or more weighting factors related to a set of metrics for a potential event occurring at a data production site based on information related to the potential event, where:
the set of metrics comprises a first metric that includes one of a plurality of severity levels for the potential event and a second metric that includes a probability of the potential event occurring,
the plurality of severity levels comprises at least two severity levels greater than a severity level of zero, and
a weighting factor provides greater weight to the first metric than to the second metric to produce a weighted first metric;
analyzing the potential event utilizing the set of metrics including the weighted first metric to determine a basis for a recommendation to swap operations from the data production site to a disaster recovery site; and
in response to a recommendation, swapping operations from the data production site to the disaster recovery site prior to an actual event corresponding to the potential event occurring at the data production site based on the recommendation,
wherein the potential event is one of a natural disaster and a social conflict.

14. The method of claim 13, wherein the set of metrics further comprises at least one of:
a third metric that includes an expected duration of the potential event; and
a fourth metric that includes an impact of the potential event.

15. The method of claim 13, further comprising:
determining one of an urgent situation and a non-urgent situation based on a predicted amount of time before the actual event occurs;
providing the recommendation to a user in response to the non-urgent situation; and
automatically swapping the data production site to the disaster recovery site in response to the urgent situation.

16. The method of claim 13, further comprising:
retrieving information related to the potential event from an external source; and
providing data to the weighting module, wherein:
the data comprises at least a portion of the retrieved information, the first metric, and the second metric, and
the external source comprises at least one of:
a government agency,
a social media entity, and
a news entity.

17. A computer program product comprising a computer-readable storage medium including program instructions embodied therewith, the program instructions executable by a processor to cause the processor to:
provide one or more weighting factors related to a set of metrics for a potential event occurring at a data production site based on information related to the potential event, wherein:
the set of metrics comprises a first metric that includes one of a plurality of severity levels for the potential event and a second metric that includes a probability of the potential event occurring,
the plurality of severity levels comprises at least two severity levels greater than a severity level of zero, and
a weighting factor provides greater weight to the first metric than to the second metric to produce a weighted first metric;
analyze the potential event utilizing the set of metrics including the weighted first metric to determine a basis for a recommendation to swap operations from the data production site to a disaster recovery site; and
swap operations from the data production site to the disaster recovery site prior to an actual event corresponding to the potential event occurring at the data production site in response to a recommendation based on the recommendation,
wherein the potential event is one of a natural disaster and a social conflict.

18. The computer program product of claim 17, wherein the set of metrics further comprises at least one of:
   a third metric that includes an expected duration of the potential event; and
   a fourth metric that includes an impact of the potential event.

19. The computer program product of claim 17, wherein the program instructions further cause the processor to:
   determine one of an urgent situation and a non-urgent situation based on a predicted amount of time before the actual event occurs;
   provide the recommendation to a user in response to the non-urgent situation; and
   automatically swap the data production site to the disaster recovery site in response to the urgent situation.

20. The computer program product of claim 17, wherein the program instructions further cause the processor to:
   retrieve information related to the potential event from an external source; and
   provide data to the weighting module,
   wherein:
      the data comprises at least a portion of the retrieved information, the first metric, and the second metric, and
      the external source comprises at least one of:
         a government agency,
         a social media entity, and
         a news entity.

* * * * *